US012125163B1

(12) United States Patent
Polyakov et al.

(10) Patent No.: US 12,125,163 B1
(45) Date of Patent: Oct. 22, 2024

(54) REAL-TIME BUILD OUT OF A VIRTUAL WORLD

(71) Applicant: KATMAI TECH INC., New York, NY (US)

(72) Inventors: Petr Polyakov, Tampa, FL (US);
Gerard Cornelis Krol, Leiden (NL);
Erik Stuart Braund, Saugerties, NY (US)

(73) Assignee: KATMAI TECH INC., New York, NY (US)

( * ) Notice: Subject to any disclaimer, the term of this patent is extended or adjusted under 35 U.S.C. 154(b) by 0 days.

(21) Appl. No.: 18/491,047

(22) Filed: Oct. 20, 2023

(51) Int. Cl.
G06T 19/20 (2011.01)
G06F 3/04815 (2022.01)
G06F 3/04845 (2022.01)
G06F 3/0486 (2013.01)

(52) U.S. Cl.
CPC .......... *G06T 19/20* (2013.01); *G06F 3/04815* (2013.01); *G06F 3/04845* (2013.01); *G06F 3/0486* (2013.01); *G06T 2200/24* (2013.01); *G06T 2219/024* (2013.01); *G06T 2219/2004* (2013.01); *G06T 2219/2016* (2013.01)

(58) Field of Classification Search
CPC .................. G06T 19/20; G06T 2200/24; G06T 2219/024; G06T 2219/2004; G06T 2219/2016; G06T 19/00; G06T 19/006; G06F 3/04815; G06F 3/04845; G06F 3/0486

See application file for complete search history.

(56) References Cited

U.S. PATENT DOCUMENTS

| | | | | |
|---|---|---|---|---|
| 7,484,183 B2 * | 1/2009 | Look | ...................... | G06F 30/13 715/773 |
| 9,583,140 B1 * | 2/2017 | Rady | ................ | H04N 21/44004 |
| 9,959,675 B2 * | 5/2018 | Gal | .......................... | G06F 30/00 |
| 10,373,342 B1 * | 8/2019 | Perez, III | ................ | G06F 3/011 |
| 10,818,093 B2 * | 10/2020 | Chen | ..................... | G06T 19/006 |
| 10,979,672 B1 * | 4/2021 | Krol | ........................ | G06F 3/011 |
| 11,227,448 B2 * | 1/2022 | Lebaredian | .......... | G06Q 10/101 |
| 11,651,108 B1 * | 5/2023 | Swanson | ................ | H04N 7/157 726/27 |
| 11,755,180 B1 * | 9/2023 | Edelblut | ................. | G06F 3/011 715/760 |
| 2009/0100368 A1 * | 4/2009 | Look | ...................... | G06F 30/13 715/775 |

(Continued)

*Primary Examiner* — Motilewa Good-Johnson
(74) *Attorney, Agent, or Firm* — Sterne, Kessler, Goldstein & Fox P.L.L.C.

(57) ABSTRACT

Disclosed herein is a system that allows for the real-time build out of a virtual environment. The system and methods receive, via a web browser, a user selection of a three-dimensional (3D) model in a virtual environment. The user selection is made during an active user session of the user. Based on receiving the user selection, an editor is launched from within the web browser. The editor is used to modify properties of the 3D model in real-time during the active user session. One or more user inputs are received indicating the properties of the 3D model to be modified. Based on the one or more user inputs, the properties of the 3D model are modified in real-time. The 3D model is rendered to reflect the properties within the virtual environment during the active user session.

20 Claims, 9 Drawing Sheets

(56) References Cited

U.S. PATENT DOCUMENTS

| | | | |
|---|---|---|---|
| 2009/0119731 A1* | 5/2009 | Perlman | A63F 13/335 |
| | | | 725/115 |
| 2012/0229449 A1* | 9/2012 | Psistakis | G06T 19/00 |
| | | | 345/419 |
| 2012/0233555 A1* | 9/2012 | Psistakis | G11B 27/034 |
| | | | 715/751 |
| 2015/0161818 A1* | 6/2015 | Komenczi | H04N 13/296 |
| | | | 348/43 |
| 2017/0103584 A1* | 4/2017 | Vats | G06T 19/20 |
| 2018/0224945 A1* | 8/2018 | Hardie-Bick | G06F 3/016 |
| 2020/0312029 A1* | 10/2020 | Heinen | G06T 17/20 |
| 2020/0363930 A1* | 11/2020 | Srinivasan | G06F 3/04842 |
| 2022/0138467 A1* | 5/2022 | Eastman | G06Q 50/06 |
| | | | 345/633 |
| 2023/0169733 A1* | 6/2023 | Krishna | G06T 19/00 |
| | | | 345/419 |
| 2024/0129485 A1* | 4/2024 | Malamal Vadakital | |
| | | | H04N 19/18 |

\* cited by examiner

REAL-TIME BUILD OUT OF A VIRTUAL WORLD

TECHNICAL FIELD

This field is generally related to virtual/simulated environments.

BACKGROUND

Virtual environments, such as those found in sandbox games or those in massively multiplayer online games (MMOs), are typically built by developers using standard application development techniques. These techniques typically have developers write code using standard programming languages to build out the framework of the virtual environment. Various objects and models (e.g., 3-dimensional (3D) models) found in the virtual environment are also hard coded as part of the build out, along with their various functionalities. The code then has to go through quality assurance (QA) and testing and if it passes QA the code is then pushed to the production environment. Any changes made to the virtual environment or functions of the various objects and models has to be modified at the code level, retested, and pushed to the production environment through various patches and/or releases. This process is time consuming. It also delays the release of new features and functions often desired by users of the virtual environment.

To the extent that typical MMOs and sandbox games allow players to add features to virtual environments, for example in games such as the ROBLOX game available from Roblox Corporation of San Mateo, CA, and the MINECRAFT game available from Mojang Studios of Stockholm, Sweden, these MMOs and sandbox games are run as desktop applications and not as web applications designed to be run from a web browser. That's because the performance requirements of such MMOs and sandbox games make it difficult to program the applications for a web browser. Thus, applications have to be downloaded and run from a user's desktop environment. This can be a problem if a user's system is not designed to handle the performance requirements of the MMO or sandbox game. Thus, many users might be precluded from playing the MMO or sandbox game due to hardware restrictions.

Thus, it is desirable to implement a system in which users have the ability to build virtual environments in real-time, add and/or modify the functionality of objects and/or models within the virtual environments in real-time, and have the ability to do this using a web-based application run from a web browser.

SUMMARY

In aspects, a system, computer-implemented method, and non-transitory computer readable medium including instructions to perform operations are disclosed. The system, method, and operations enable a virtual environment to be built out and/or modified in real-time using a web-application run from a web browser. Virtual environments or a virtual environment refers to a networked application that allows a user to interact with both the computing environment and other users. For example, virtual environments include simulated environments that are generated through computer-generated images (CGI), such as video games, Metaverse, augmented reality/virtual reality (AR/VR) environments, virtual conference spaces, etc.

In aspects, the system, method, and operations enable the build out via an editor launched from within the web browser. In aspects, the editor can be launched when objects and/or models within the virtual environment are selected, clicked, or interacted with. In aspects, the editor can also be launched independently from within the web browser prior to any objects and/or models being selected, clicked, or interacted with. In aspects, the editor allows for properties of the objects and/or models to be modified in real-time by a user of the virtual environment while the user of the virtual environment has an active user session. An active user session refers to a scenario where a user of the virtual environment is actively navigating and using the virtual environment. This navigation and use includes interacting with other users and/or the environment while the virtual environment is live and/or in production.

In aspects, the system, method, and operations enables that the build outs and/or modifications to be reflected in the virtual environment in real-time. Thus, other users of the virtual environment can see these changes near instantly from when they are made. Near instantly refers to the build outs and/or modifications being reflected within seconds or milliseconds from when they are made in the editor. In this way, the virtual environment can be build on the fly and changes can be reflected to other users of the virtual environment near instantaneously.

In aspects, the build out can be collaborative. For example, multiple users can be involved in building out the virtual environment in real-time. Thus, each user can be involved in creating some aspect of the virtual environment. In this way, the virtual environment can be constructed by multiple users simultaneously. This speeds up the build out of the virtual environment.

In aspects, the editor allows users to build out the virtual environment, and/or make the modifications to the objects and/or models without having to write source code. For example, in aspects, the editor can provide users with a framework and a list of properties for the objects and/or models that can be used as building blocks of the virtual environment. In aspects, the properties can be set for the objects and/or models from within the editor. For example, the properties can include what happens to the objects and/or models upon triggers (e.g., mouse clicks, hover overs, when an avatar is within a distance or proximity of the object and/or model, a detected user action, a movement of the user avatar, a time, or an event originating from outside the virtual environment). The properties can also relate to the look and feel of objects and/or models. For example, the shape and size of objects, the location of objects, etc.

In aspects, the properties can be selected and set using drop down components or input fields that allow users to input values and/or logic (e.g., if-else conditions) for what happens to the objects and/or models upon the triggers occurring, or to set other properties of the objects and/or models. In aspects, the editor can also allow users to use drag and drop techniques to build out the virtual environment. For example, objects and/or models can be selected, inserted, and placed into a virtual environment using drag and drop techniques in which a mouse selects, inserts, and places the object and/or model into the virtual environment. Once placed, the properties of the object can be set using the drop downs or input fields. In aspects, the properties can also be set using a programming language. The programming language can be an existing programming language such as JavaScript, or a custom defined language that allows the properties to be set within the editor. Users of the virtual environment can use a window or portion of the editor to write logic using the programming language to set the properties.

In aspects, the build out and/or modifications to the virtual environment can be populated to other users in real-time, such that other users of the virtual environment can see the changes near instantly from when they are made. How this is done will be described further below. In this way, the system, method, and operations provide a real-time way of building a virtual environment that is populated to all users of the virtual environment on the fly. This results in quicker build outs. Another benefit is that users can see and provide feedback on any changes made near instantly. In this way, problems or errors with any implementation, and/or poor user experience can be given to users making changes near instantaneously. In this way, time spend troubleshooting or fixing errors is reduced and the time spent developing the virtual environment is reduced.

In aspects, the system, method, and operations can enable performance of the aforementioned functions by receiving, by one or more computing devices and via a web browser, a user selection of a 3D model in a virtual environment. The user selection is made during an active user session of the user. In aspects, based on receiving the user selection, an editor can be launched from within the web browser. The editor can be used to modify properties of the 3D model in real-time during the active user session. In aspects, one or more user inputs can be received indicating the properties of the 3D model to be set or modified. Based on the one or more user inputs, the properties of the 3D model can be modified in real-time. In aspects, the 3D model can be rendered to reflect the properties within the virtual environment during the active user session for other users of the virtual environment.

In aspects, modifying the properties includes setting an action to occur based on a trigger event occurring for the 3D model. In aspects, the trigger event can include, for example, a mouse click, a proximity of a user avatar to the 3D model, or a mouse hovering over the 3D model, a detected user action (e.g., a user walking away from the computer, a user pressing a key, etc.), a movement of the user avatar, a time, or an event originating from outside the virtual environment (e.g., a stock index hitting a predetermined level, a real-world event, a news story, etc.). In aspects, if the trigger event occurs for the 3D model, the action can occur. In aspects, the action can be synchronized in the virtual environment for one or more other users of the virtual environment to indicate/reflect the action to the one or more other users. In aspects, the synchronization can be done by storing a timestamp indicating when the trigger event occurred, and replaying events that occurred in the virtual environment for the 3D model for the one or more other users starting from the timestamp to a present time to indicate a current state of the 3D model.

In aspects, the editor further allows modification of the virtual environment in real-time by allowing the user to add further 3D models to the virtual environment. In aspects, the further 3D models are added using drag and drop techniques. In aspects, one or more further user inputs indicating properties of the further 3D models to be modified can be received. Based on the one or more further user inputs, the properties of the further 3D models can be modified in real-time. In aspects, the further 3D models can be rendered to reflect the updated properties of the further 3D models within the virtual environment during the active user session.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

In the drawings, like reference numbers generally indicate identical or similar elements. Additionally, generally, the left-most digit(s) of a reference number identifies the drawing in which the reference number first appears.

DETAILED DESCRIPTION

The Virtual Environment

Figure 1:
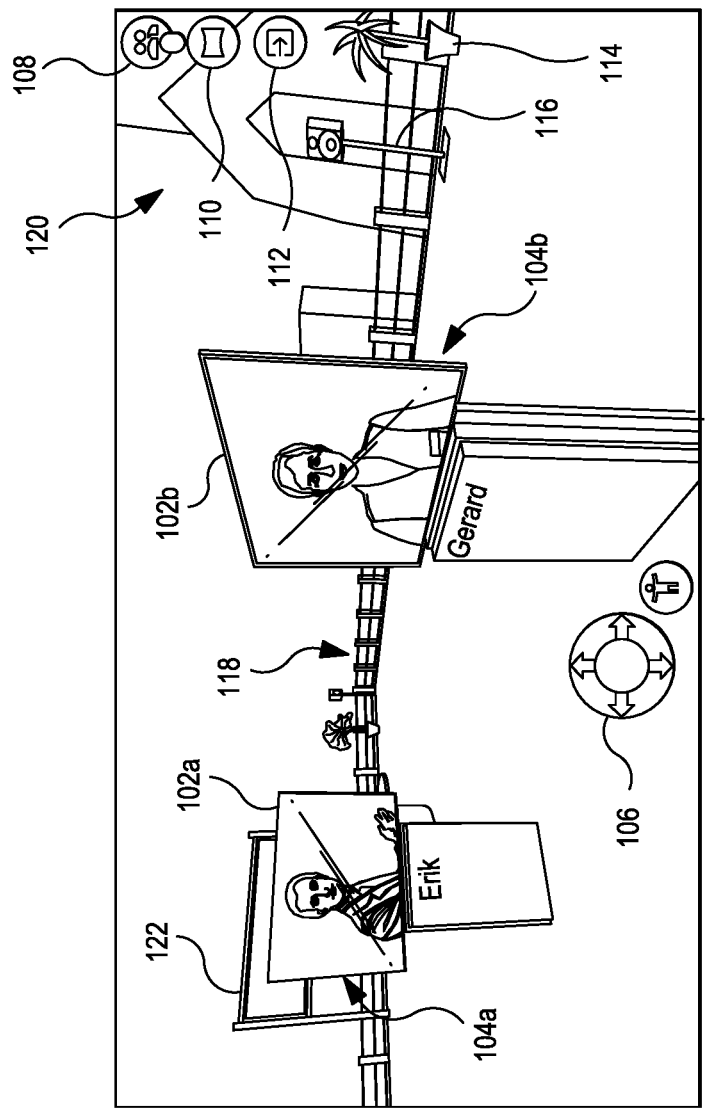
FIG. 1 is a diagram illustrating an example interface generated by the disclosed system, that shows a virtual environment with video streams being mapped onto avatars, according to aspects.

FIG. 1 is an example interface 100 generated by the disclosed system, that shows a virtual environment with video streams being mapped onto avatars, according to aspects. The interface 100 may be displayed to a participant or user of the system. For example, the participant or user may be using the system for a videoconference. It should be noted that while videoconferencing is the primary example illustrated throughout this disclosure, the virtual environment and the interface 100 may be used for other purposes. For example, the virtual environment and the interface 100 may be used in massively multiplayer online game (MMO) applications to display a game to a player, sandbox games, a virtual concert application to show an online concert to a concert goer, a virtual event application to show the event to an event goer, or generally as part of any software application designed to be used in the Metaverse where a three-dimensional, immersive, interactive, and social experience is the goal of the application in which a user participates. A POSA will understand the applicability of the virtual environment and the interface 100 to various applications based on reading this disclosure.

Continuing with the videoconference example, in aspects, the interface 100 may be rendered for display to a participant of the videoconference, and may be constantly updated as the videoconference progresses. A user may control the orientation of their virtual camera using, for example, keyboard inputs, a gamepad controller, or touch screen inputs. In this way, the user can navigate around the virtual environment. In aspects, different inputs may change a virtual camera's X and Y position and pan and tilt angles in the virtual environment. In further aspects, a user may use inputs to alter height (the Z coordinate) or yaw of the virtual camera. In still further aspects, a user may enter inputs to cause the virtual camera to "hop" up while returning to its original position, simulating gravity. The inputs available to navigate the virtual camera may include, for example, keyboard, gamepad controller, and mouse inputs, such as WASD keyboard keys to move the virtual camera forward, backward, left, or right on an X-Y plane, a space bar key to "hop" the virtual camera, and mouse movements specifying changes in pan and tilt angles. Alternatively, users can use a virtual joystick 106 shown on a display and which may be interacted with by the user to perform the same functions.

In aspects, the interface 100 includes avatars 102a and 102b, which each represent different participants to the videoconference. Avatars 102a and 102b, respectively, have texture mapped video streams 104a and 104b from devices of the first and second participant. A texture map is an image applied (mapped) to the surface of a shape or polygon. Here, the images are respective frames of the video. The camera devices capturing video streams 104a and 104b are positioned to capture faces of the respective participants. In this way, the avatars have texture mapped thereon, moving images of faces as participants in the meeting talk and listen.

Similar to how the virtual camera is controlled by the user viewing the interface 100, the location and direction of avatars 102a and 102b are controlled by the respective participants that they represent. Avatars 102a and 102b are 3D models represented by a mesh. Each avatar 102a and 102b may have the participant's name underneath the avatar.

The respective avatars 102a and 102b are controlled by the various users. They each may be positioned at a point corresponding to where their own virtual cameras are located within the virtual environment. Just as the user viewing the interface 100 can move around the virtual camera, the various users can move around their respective avatars 102a and 102b.

The virtual environment rendered in the interface 100 includes background image 120 and a 3D model 118 of an arena. The arena may be a venue or building in which the videoconference should take place. The arena may include a floor area bounded by walls. The 3D model 118 can include a mesh and texture. Other ways to mathematically represent the surface of 3D model 118 may be possible as well. For example, polygon modeling, curve modeling, and digital sculpting may be possible. For example, the 3D model 118 may be represented by voxels, splines, geometric primitives, polygons, or any other possible representation in 3D space. The 3D model 118 may also include specification of light sources. The light sources can include for example, point, directional, spotlight, and ambient. The objects may also have certain properties describing how they reflect light. In examples, the properties may include diffuse, ambient, and spectral lighting interactions.

In addition to the arena, the virtual environment can include various other 3D models that illustrate different components of the environment. For example, the virtual environment can include a decorative model 114, a speaker model 116, and a presentation screen model 122. Just as model 118, these models may be represented using any mathematical way to represent a geometric surface in three-dimensional space. These models may be separate from model 118 or combined into a single representation of the virtual environment. Decorative models, such as decorative model 114, serve to enhance the realism and increase the aesthetic appeal of the arena. The speaker model 116 may virtually emit sound, such as presentation and background music. The presentation screen model 122 can serve to provide an outlet to present a presentation. Video of the presenter or a presentation screen share may be texture mapped onto the presentation screen model 122.

A button 108 may provide the user a list of participants. In one example, after a user selects the button 108, the user can chat with other participants by sending text messages, individually or as a group.

A further button 110 may enable a user to change attributes of the virtual camera used to render the interface 100. For example, the virtual camera may have a field of view specifying the angle at which the data is rendered for display. Modeling data within the camera field of view is rendered, while modeling data outside the camera's field of view may not be. By default, the virtual camera's field of view may be set somewhere between 60 and 110 degrees, which is commensurate with a wide-angle lens and human vision. However, selecting the further button 110 may cause the virtual camera to increase the field of view to exceed 170 degrees, commensurate with a fisheye lens. This may enable a user to have broader peripheral awareness of his or her surroundings in the virtual environment.

Finally, a still further button 112 can cause the user to exit the virtual environment. Selecting the still further button 112 may cause a notification to be sent to devices belonging to the other participants signaling to their devices to stop displaying the avatar corresponding to the user that has exited the virtual environment.

In this way, the interface 100's virtual 3D space is used to conduct video conferencing. Every user controls an avatar, which they can control to move around, look around, jump or do other things which change the position or orientation. A virtual camera shows the user the virtual environment and the other avatars. The avatars of the other users have, as an integral part, a virtual display, which shows the webcam image of the user.

By giving users a sense of space and allowing users to see each other's faces, aspects provide a more social experience than conventional web conferencing or conventional MMO gaming. That more social experience has a variety of applications. For example, it may be used in online shopping. For example, the interface 100 has applications in providing virtual grocery stores, houses of worship, trade shows, B2B sales, B2C sales, schooling, restaurants or lunchrooms, product releases, construction site visits (e.g., for architects, engineers, contractors), office spaces (e.g., people work "at their desks" virtually), controlling machinery remotely (ships, vehicles, planes, submarines, drones, drilling equipment, etc.), plant/factory control rooms, medical procedures, garden designs, virtual bus tours with guides, music events (e.g., concerts), lectures (e.g., TED talks), meetings of political parties, board meetings, underwater research, research on hard to reach places, training for emergencies (e.g., fire), cooking, shopping (with checkout and delivery), virtual arts and crafts (e.g., painting and pottery), marriages, funerals, baptisms, remote sports training, counseling, treating fears (e.g., confrontation therapy), fashion shows, amusement parks, home decoration, watching sports, watching e-sports, watching performances captured using a 3D camera, playing board and role playing games, walking over/through medical imagery, viewing geological data, learning languages, meeting in a space for the visually impaired, meeting in a space for the hearing impaired, participation in events by people who normally can't walk or stand up, presenting the news or weather, talk shows, book signings, voting, MMOs, buying/selling virtual locations (such as those available in some MMOs like the SECOND LIFE game available from Linden Research, Inc. of San Francisco, CA), flea markets, garage sales, travel agencies, banks, archives, computer process management, fencing/sword fighting/martial arts, reenactments (e.g., reenacting a crime scene and or accident), rehearsing a real event (e.g., a wedding, presentation, show, space-walk), evaluating or viewing a real event captured with 3D cameras, livestock shows, zoos, experiencing life as a tall/short/blind/deaf/white/black person (e.g., a modified video stream or still image for the virtual environment to simulate the perspective that a user wishes to experience), job interviews, game shows, interactive fiction (e.g., murder mystery), virtual fishing, virtual sailing, psychological research, behavioral analysis, virtual sports (e.g., climbing/bouldering), controlling the lights etc. in your house or other location (domotics), memory palace, archaeology, gift shop, virtual visit so customers will be more comfortable on their real visit, virtual medical procedures to explain the procedures and have people feel more comfortable, and a virtual trading floor/financial marketplace/stock market (e.g., integrating real-time data and video streams into the virtual environment, real-time transactions and analytics), virtual locations people have to go to as part of their work so they will actually meet each other organically (e.g., if you want to create an invoice, it is only possible from within the virtual location) and augmented reality where you project the face of the person on top of their AR headset (or helmet) so you can see their facial expressions (e.g., for military, law enforcement, firefighters, special ops), and making reservations (e.g., for a certain holiday home/car/etc.)

Figure 2:
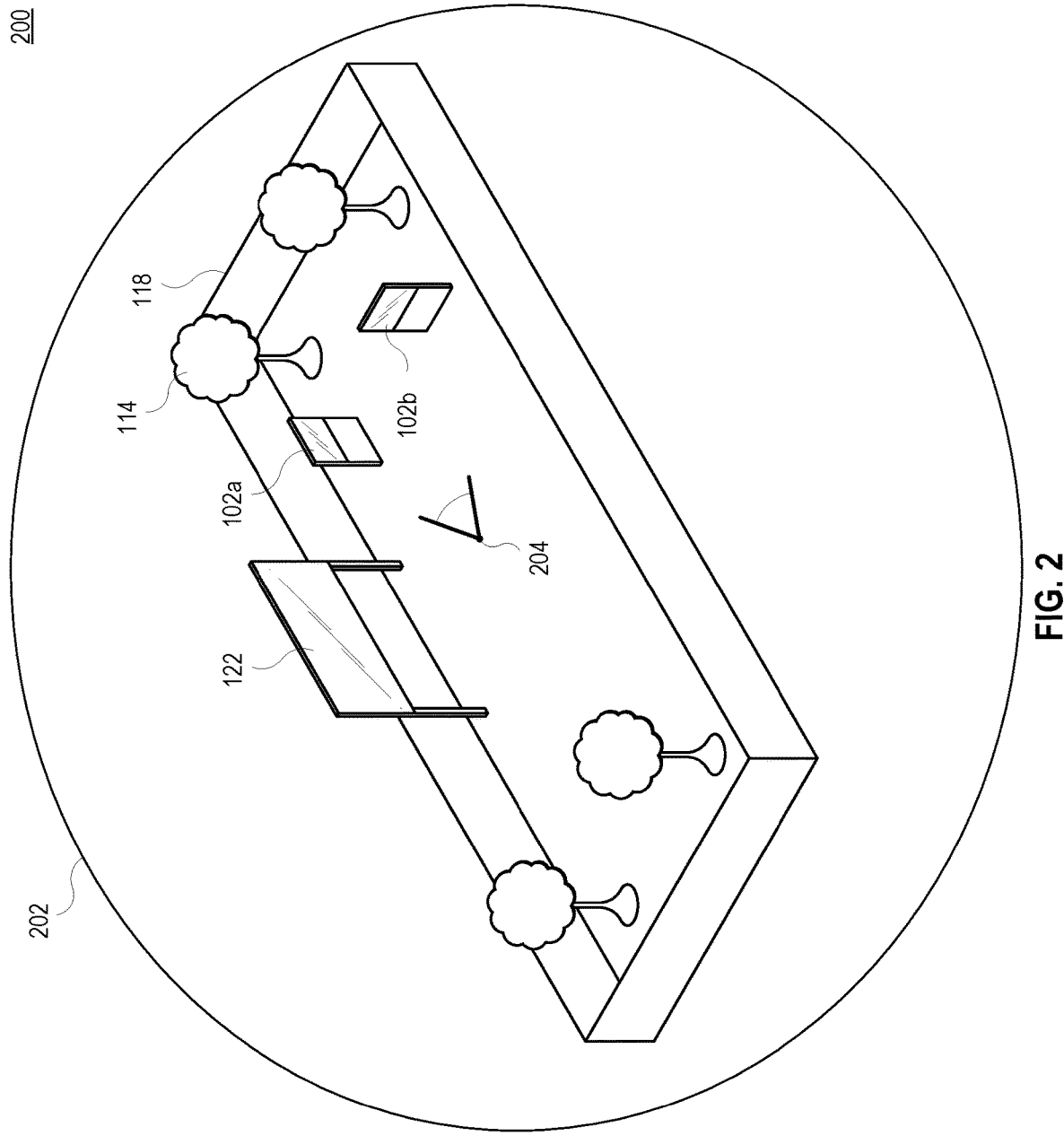
FIG. 2 is a diagram illustrating an example 3D model rendered in the virtual environment, according to aspects.

FIG. 2 is a diagram 200 illustrating an example 3D model rendered in the virtual environment, according to aspects. Just as illustrated in FIG. 1, the virtual environment here includes a 3D model 118 of an arena, and various 3D models, including 3D models 114 and 122. Also as illustrated in FIG. 1, diagram 200 includes avatars 102a and 102b navigating around the virtual environment.

As described above, interface 100 in FIG. 1 is rendered from the perspective of a virtual camera. That virtual camera is illustrated in diagram 200 as a virtual camera 204. As mentioned above, the user viewing interface 100 in FIG. 1 can control the virtual camera 204 and navigate the virtual camera 204 in 3D space. The interface 100 is constantly being updated according to the new position of the virtual camera 204 and any changes of the models within the field of view of the virtual camera 204. As described above, the field of view of the virtual camera 204 may be frustum defined, at least in part, by horizontal and vertical field of view angles.

As described above with respect to FIG. 1, a background image, or texture, may define at least part of the virtual environment. The background image may capture aspects of the virtual environment that are meant to appear at a distance. The background image may be texture mapped onto a sphere 202. The virtual camera 204 may be at an origin of the sphere 202. In this way, distant features of the virtual environment may be efficiently rendered.

In other aspects, other shapes instead of the sphere 202 may be used to texture map the background image. In various alternative aspects, the shape may be a cylinder, cube, rectangular prism, or any other 3D geometry.

Figure 3:
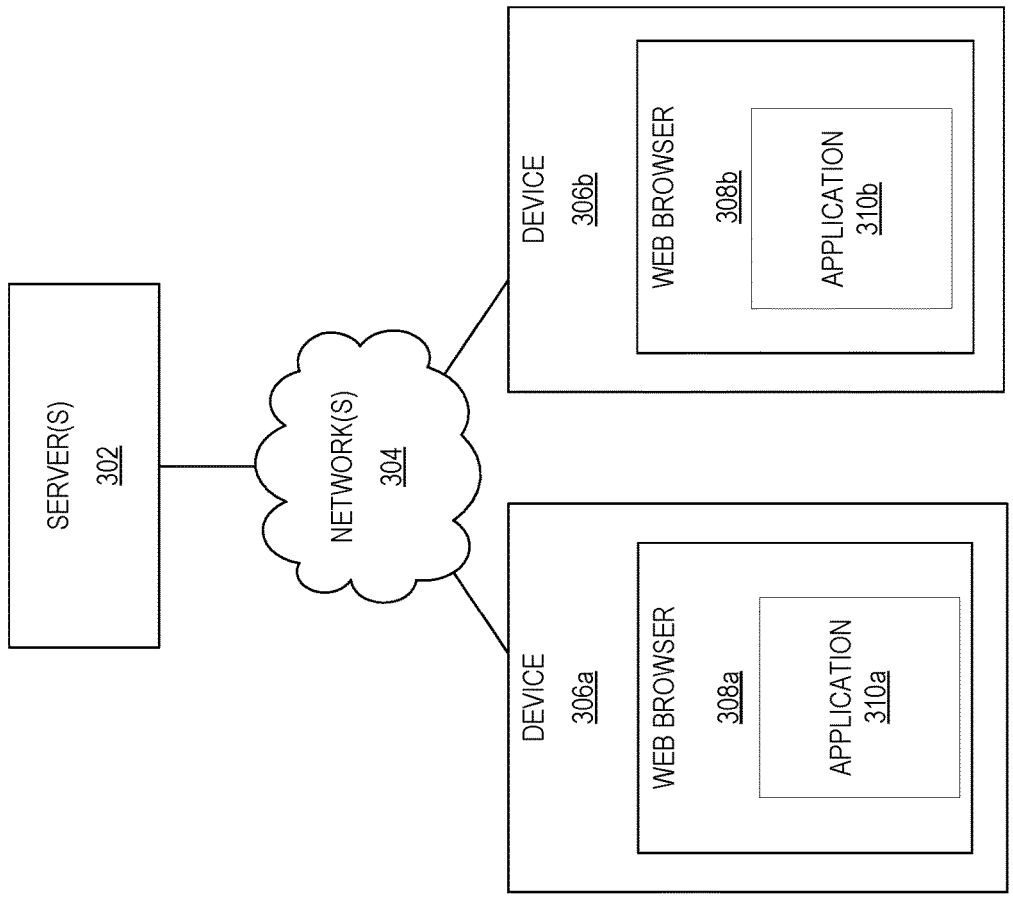
FIG. 3 is a diagram illustrating a high-level architecture of the system, according to aspects.

FIG. 3 is a diagram illustrating a high-level architecture 300 of the system, according to aspects. The architecture includes one or more servers 302 coupled to devices 306a and 306b via a network 304.

The servers 302 provide the services to connect a user session (e.g., a video conference, gaming, etc.) between devices 306a and 306b. As will be described in greater detail below, the servers 302 communicate notifications to devices of participants (e.g., devices 306a and 306b) when new participants join the virtual environment and when existing participants leave the virtual environment. The servers 302 communicate messages describing a user state in the virtual environment for respective participant's. The user state can include a position and direction of the participant's virtual cameras within the virtual environment. The user state can also include whether a user is muted or not, in addition to other settings for the user's avatar. The servers 302 also communicate video and audio streams between the respective devices of the participants (e.g., devices 306a and 306b). Finally, the servers 302 store and transmit data describing data specifying the virtual environment to the respective devices 306a and 306b.

In addition to the data necessary for the virtual conference, the servers 302 may provide executable information that instruct the devices 306a and 306b on how to render the data to provide the interactivity in the virtual environment.

The servers 302 respond to requests with a response. The servers 302 may include a web server. A web server is software and hardware that uses HTTP (Hypertext Transfer Protocol) and other protocols to respond to client requests made over the World Wide Web. The main job of the web server is to display website content through storing, processing, and delivering web pages to users. The web server and its functionality will be discussed further below.

In an alternative aspect, communication between devices 306a and 306b happens not through the servers 302 but on a peer-to-peer basis. In that aspect, one or more of the data describing the respective participants' location and direction, the notifications regarding new and existing participants, and the video and audio streams of the respective participants are communicated not through server 302 but directly between devices 306a and 306b.

The network 304 enables communication between the various devices 306a and 306b and the servers 302. The network 304 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or any combination of two or more such networks.

The devices 306a and 306b are each devices of respective participants to the virtual environment. The devices 306a and 306b each receive data necessary to conduct activities in the virtual environment such as a virtual conference and render the data necessary to provide the virtual conference. As will be described in greater detail below, the devices 306a and 306b include a display to present the rendered models, inputs that allow the user to control the virtual camera, a speaker (such as a headset) to provide audio to the user in the virtual environment, a microphone to capture a user's voice input, and a camera positioned to capture video of the user's face, etc.

The devices 306a and 306b may be any type of computing device, including a laptop, a desktop, a smartphone, a tablet computer, or a wearable computer (such as a smartwatch or a augmented reality or virtual reality headset).

Web browsers 308a and 308b can retrieve a network resource (such as a webpage) addressed by the link identifier (such as a uniform resource locator, or URL) and present the network resource for display. In particular, web browsers 308a and 308b are software applications for accessing information on the World Wide Web. Usually, web browsers 308a and 308b make this request using the hypertext transfer protocol (HTTP or HTTPS). When a user requests a web page from a particular website, the web browsers 308a and 308b retrieve the necessary content from a web server, interpret and execute the content, and then display the page on a display on devices 306a and 306b shown as client/counterpart conference applications 310a and 310b. In examples, the content may have HTML and client-side scripting, such as JavaScript. Once displayed, a user can input information and make selections on the page, which can cause web browsers 308a and 308b to make further requests.

Applications 310a and 310b may be web applications downloaded from the servers 302 and configured to be executed by the respective web browsers 308a and 308b. In an aspect, The application 310a and 310b may be, for example conference applications. In aspects, Applications 310a and 310b may be JavaScript applications. In one example, applications 310a and 310b may be written in a higher-level language, such as a Typescript language, and translated or compiled into JavaScript. Applications 310a and 310b may be configured to interact with the WebGL JavaScript application programming interface. They may have control code specified in JavaScript and shader code written in OpenGL ES Shading Language (GLSL ES). Using the WebGL API, applications 310a and 310b may be able to utilize a graphics processing unit (not shown) of devices 306a and 306b. Moreover, OpenGL rendering of interactive 2D and 3D graphics without the use of plug-ins is also an option.

Applications 310a and 310b receive the data from the servers 302 describing user state of other avatars and 3D modeling information describing the virtual environment. In addition, applications 310a and 310b receive video and audio streams of other participants from the servers 302.

Applications 310a and 310b render 3D modeling data, including data describing the virtual environment and data representing the respective participant avatars. This rendering may involve rasterization, texture mapping, ray tracing, shading, or other rendering techniques. In an aspect, the rendering may involve ray tracing based on the characteristics of the virtual camera. Ray tracing involves generating an image by tracing a path of light as pixels in an image plane and simulating the effects of encounters with virtual objects. In some aspects, to enhance realism, the ray tracing may simulate optical effects such as reflection, refraction, scattering, and dispersion.

In this way, the users use web browsers 308a and 308b to enter the virtual environment. The scene is displayed on the screen of the user. The webcam video stream and microphone audio stream of the user are sent to the servers 302. When other users enter the virtual environment, an avatar model is created for them. The position of this avatar is sent to the servers 302 and received by the other users. Other users also get a notification from the servers 302 that an audio/video stream is available. The video stream of a user is placed on the avatar that was created for that user. The audio stream is played back as coming from the position of the avatar.

Figure 4A:
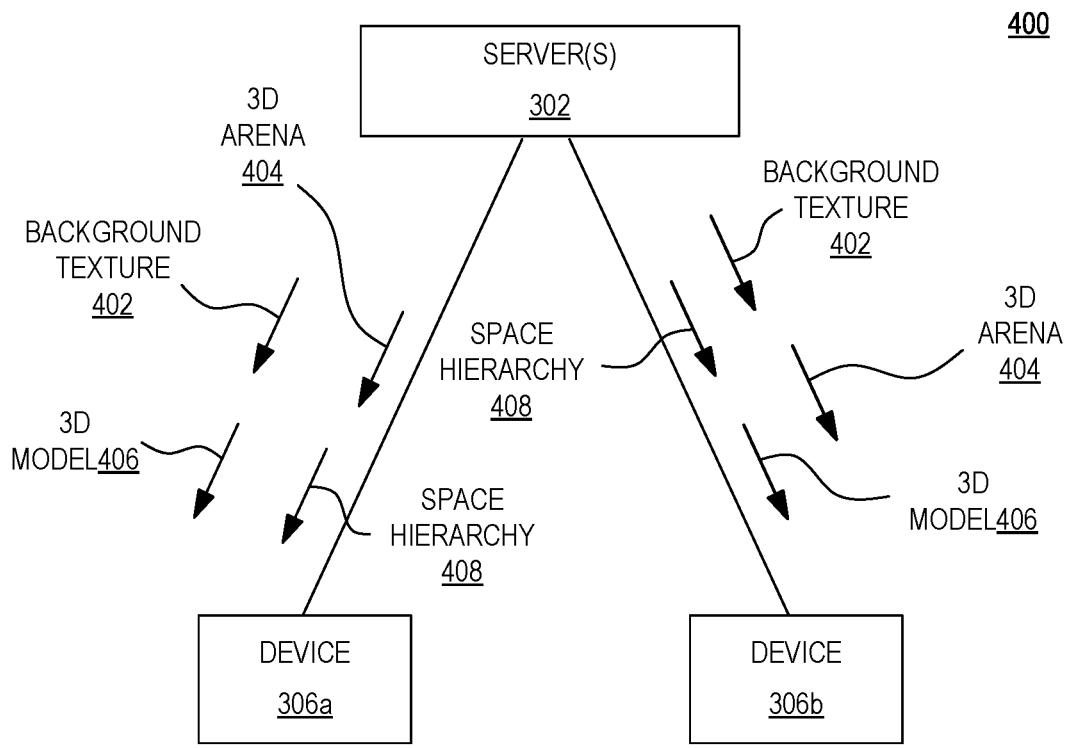
FIGS. 4A-C illustrate how data is transferred between various components of the system to provide communications between devices, according to aspects.
Figure 4B:
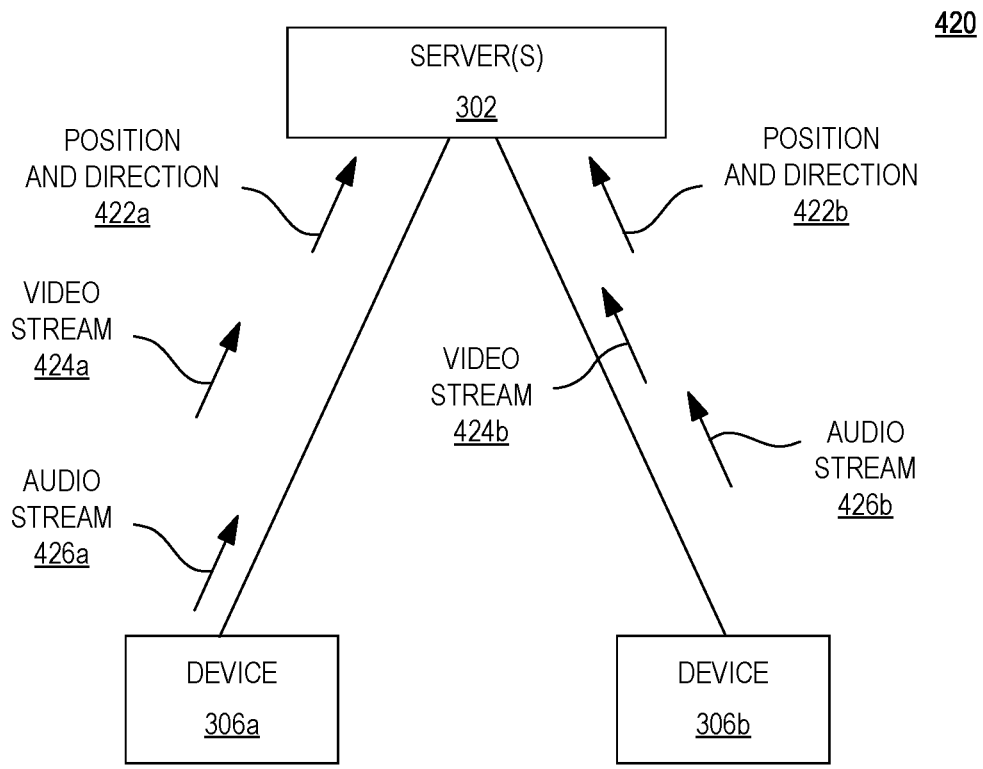
Figure 4C:
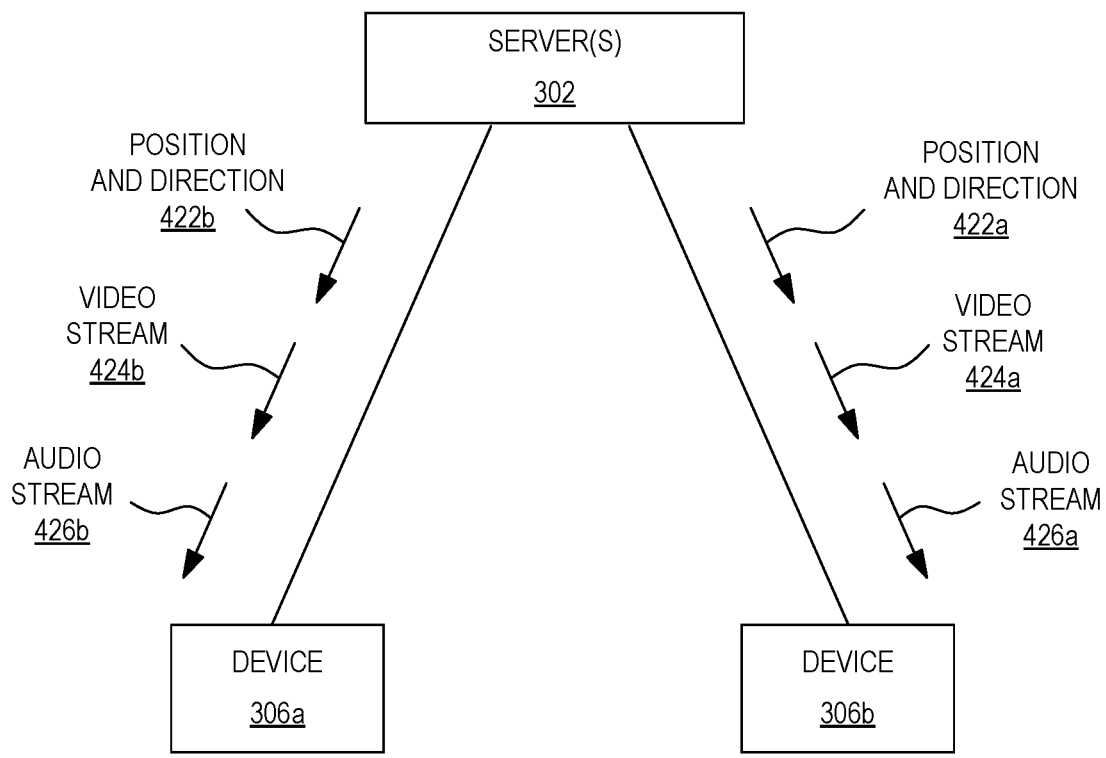

FIGS. 4A-C illustrate how data is transferred between various components of the system to provide communications between devices, according to aspects. Like in FIG. 3, each of FIGS. 4A-C depict the connection between the servers 302 and devices 306a and 306b. In particular, FIGS. 4A-C illustrate example data flows between those devices.

FIG. 4A illustrates a diagram 400 illustrating how the servers 302 transmit data describing the virtual environment to devices 306a and 306b. In particular, both devices 306a and 306b, receive from the servers 302 a 3D arena 404 (similar to the 3D arena 118 described with respect to FIG. 1), background texture 402, space hierarchy 408, and any other 3D modeling information 406. This 3D modeling information 406 the information provided to build out and/or modify 3D models in the virtual world. How this build out and/or modifying is performed will be described with respect to FIGS. 5-7 below.

As described above, background texture 402 is an image illustrating distant features of the virtual environment. The image may be regular (such as a brick wall) or irregular. Background texture 402 may be encoded in any common image file format, such as bitmap, JPEG, GIF, or other file image format. It describes the background image to be rendered against, for example, a sphere at a distance.

The 3D arena 404 is a 3D model of the space of the virtual environment (e.g., the space where the conference is to take place). As described above, it may include, for example, a mesh and possibly its own texture information to be mapped upon the 3D primitives it describes. It may define the space in which the virtual camera and respective avatars can navigate within the virtual environment. Accordingly, it may be bounded by edges (such as walls or fences) that illustrate to users the perimeter of the navigable virtual environment.

The space hierarchy 408 is data specifying partitions in the virtual environment. These partitions are used to determine how sound is processed before being transferred between participants. The partition data may be hierarchical and may describe sound processing to allow for areas where participants can have private conversations or side conversations.

The 3D model 406 is any other 3D modeling information needed to conduct the conference. In one aspect, this may include information describing the respective avatars. Alternatively or additionally, this information may include product demonstrations.

With the information needed to conduct the meeting sent to the participants, FIGS. 4B-C illustrate how the servers 302 forwards information from one device to another. FIG. 4B illustrates a diagram 420 showing how the servers 302 receive information from respective devices 306a and 306b, and FIG. 4C illustrates a diagram 420 showing how the servers 302 transmit the information to respective devices 306b and 306a. In particular, device 306a transmits a user's state, (e.g., position and direction 422a, video stream 424a, and audio stream 426a) to the servers 302, which transmits the user's state (e.g., position and direction 422a, video stream 424a, and audio stream 426a) to device 306b. And device 306b transmits the user's state (e.g., position and direction 422b, video stream 424b, and audio stream 426b) to the servers 302, which transmit the user's state (e.g., position and direction 422b, video stream 424b, and audio stream 426b) to device 306a.

The position and direction 422*a* and 422*b* describe the position and direction of the virtual camera for the user using device 306*a*. As described above, the position may be a coordinate in three-dimensional space (e.g., x, y, and z coordinate) and the direction may be a direction in three-dimensional space (e.g., pan, tilt, and roll). In some aspects, the user may be unable to control the virtual camera's roll, so the direction may only specify pan and tilt angles. Similarly, in some aspects, the user may be unable to change the avatar's z coordinate (as the avatar is bounded by virtual gravity), so the z coordinate may be unnecessary. In this way, position and direction 422*a* and 422*b* each may include at least a coordinate on a horizontal plane in the virtual environment and a pan and tilt value. Alternatively or additionally, the user may be able to "jump" its avatar, so the Z position may be specified only by an indication of whether the user is jumping their avatar. In different examples, the user's state may be transmitted and received using HTTP request responses or using socket messaging.

Video streams 424*a* and 424*b* are video data captured from a camera of the respective devices 306*a* and 306*b*. The video may be compressed. For example, the video may use any commonly known video codecs, including MPEG-4, VP8, or H.264. The video may be captured and transmitted in real-time.

Similarly, audio streams 426*a* and 426*b* are audio data captured from a microphone of the respective devices. The audio may be compressed. For example, the video may use any commonly known audio codecs, including MPEG-4 or vorbis. The audio may be captured and transmitted in real-time. Video stream 424*a* and audio stream 426*a* are captured, transmitted, and presented synchronously with one another. Similarly, video stream 424*b* and audio stream 426*b* are captured, transmitted, and presented synchronously with one another.

The video streams 424*a* and 424*b* and audio streams 426*a* and 426*b* may be transmitted using the WebRTC application programming interface. The WebRTC is an API available in JavaScript. As described above, devices 306*a* and 306*b* download and run web applications, as conference applications 310*a* and 310*b*, and conference applications 310*a* and 310*b* may be implemented in JavaScript. Conference applications 310*a* and 310*b* may use WebRTC to receive and transmit video streams 424*a* and 424*b* and audio streams 426*a* and 426*b* by making API calls from its JavaScript.

As mentioned above, when a user leaves the virtual environment, this departure is communicated to all other users. For example, if device 306*a* exits the virtual environment, the servers 302 would communicate that departure to device 306*b*. Consequently, device 306*b* would stop rendering an avatar corresponding to device 306*a*, removing the avatar from the virtual space. Additionally, device 306*b* will stop receiving video stream 424*a* and audio stream 426*a*.

As described above, applications 310*a* and 310*b* may periodically or intermittently re-render the virtual space based on new information from user's state and new information relating to the virtual environment. For simplicity, each of these updates are now described from the perspective of device 306*a*. However, a skilled artisan would understand device 306*b* would behave similarly given similar changes.

As device 306*a* receives video stream 424*b*, device 306*a* texture maps frames from video stream 424*a* on to an avatar corresponding to device 306*b*. That texture mapped avatar is re-rendered within the virtual environment and presented to a user of device 306*a*.

As device 306*a* receives a new position and direction 422*b*, device 306*a* generates the avatar corresponding to device 306*b* positioned at the new position and oriented in the new direction. The generated avatar is re-rendered within the virtual environment and presented to the user of device 306*a*.

In some aspects, the servers 302 may send updated model information describing the virtual environment. For example, the servers 302 may send updated information 402, 404, 406, or 408. When that happens, device 306*a* will re-render the virtual environment based on the updated information. This may be useful when the environment changes over time. For example, an outdoor event may change from daylight to dusk as the event progresses.

Again, when device 306*b* exits the virtual environment, the servers 302 send a notification to device 306*a* indicating that device 306*b* is no longer participating. In that case, device 306*a* would re-render the virtual environment without the avatar for device 306*b*.

While FIG. 3 and FIGS. 4A-C are illustrated with two devices for simplicity, a POSA would understand that the techniques described herein may be extended to any number of devices. In an aspect, the data transferred in FIG. 4A may come from one network address for the servers 302, while the data transferred in FIGS. 4B-C may be transferred to/from another network address for the servers 302.

In one aspect, participants can set their webcam, microphone, speakers and graphical settings before entering the virtual environment. In an alternative aspect, after starting the application, users may enter a virtual lobby where they are greeted by an avatar controlled by a real person. This person is able to view and modify the webcam, microphone, speakers and graphical settings of the user. The attendant can also instruct the user on how to use the virtual environment, for example by teaching them about looking, moving around and interacting. When they are ready, the user automatically leaves the virtual waiting room and joins the real virtual environment.

Real-Time Build Out of the Virtual Environment

Figure 5:
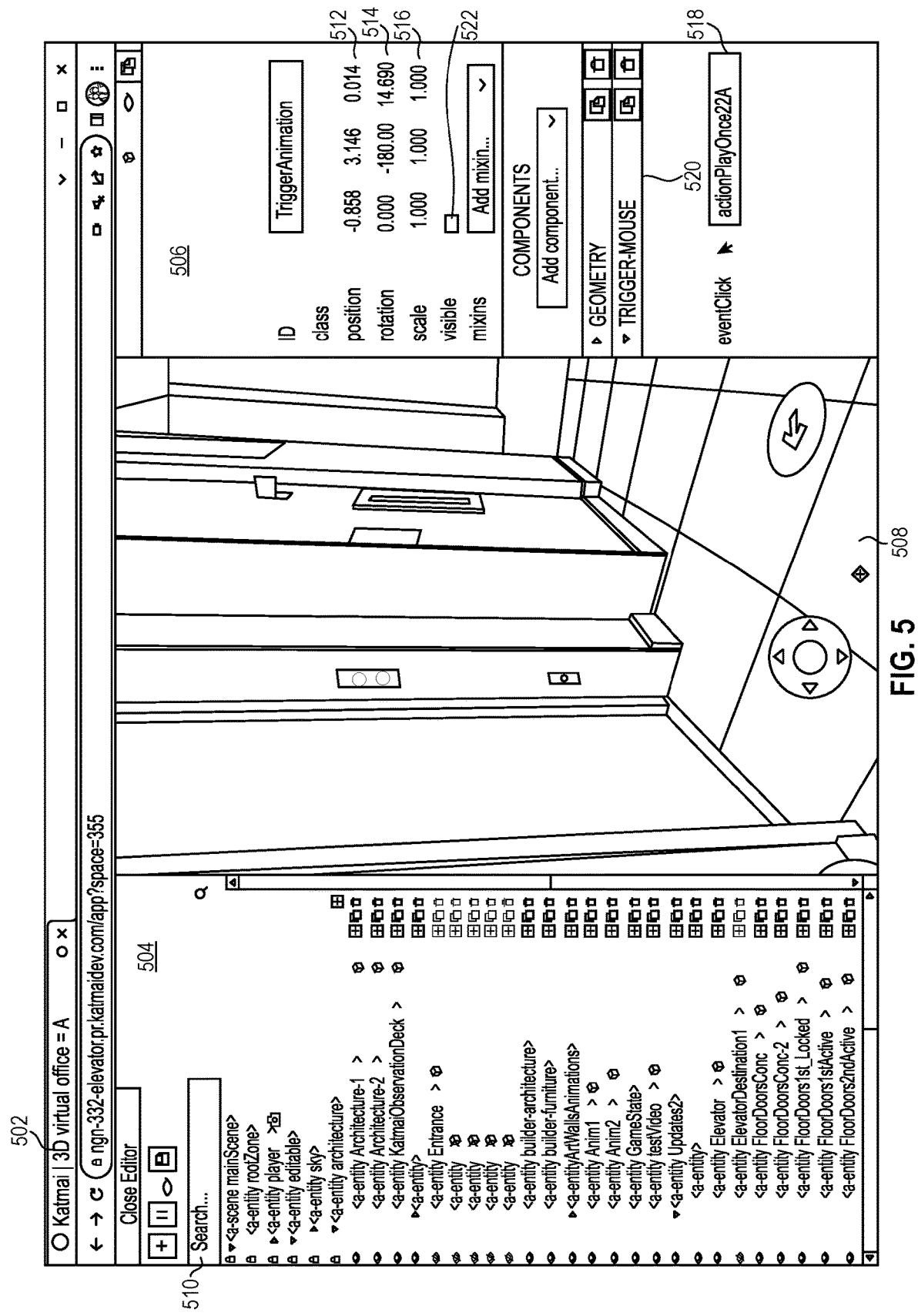
FIG. 5 is an example interface of an editor used by users of the virtual environment to build the virtual environment, according to aspects.

FIG. 5 is an example interface 502 of an editor used by users of the virtual environment to build the virtual environment, according to aspects. The build out can be done by selecting 3D models to modify and/or insert into the virtual environment using the editor. In aspects, the editor can be run from within a web browser (e.g., web browsers 308*a* or 308*b* of FIG. 3) as part of a web application (e.g., applications 310*a* and 310*b* of FIG. 3).

In aspects, and as shown in FIG. 5, the editor have the separate panels framed within the web browser. These are shown as a left panel 504 and a right panel 506. Each of these panels can be used to select 3D models within the virtual environment and to edit/modify properties of those 3D models. In aspects, center screen 508 can be a live screenshot of the virtual environment from the perspective of a user using the editor. In FIG. 5, the center screen 508 shows an office space and shows the user facing a virtual elevator in the office space.

In aspects, a user can select 3D models in the virtual environment using the center screen 508. This can be done by, for example, selecting 3D models using a mouse in order to click on the 3D models. In aspects, the selecting can also be done by searching for object via a search field 510 on the left panel 504. For example, a user can type in "Elevator" in the search field 510 to search for the 3D model of the elevator shown in FIG. 5. Alternatively, the left panel 504 can be populated with the various 3D models being shown on the center screen 508, and a user can select the particular 3D model by clicking on the 3D model "< a-entity>" identifier in the left panel 504.

In aspects, once a 3D model is selected, the right panel 506 can be populated with the various properties of the 3D model selected. In aspects, the right panel 506 can be used to modify/edit the properties of the 3D model. In aspects, a user can modify/edit the properties of the 3D model from within the right panel 506 by having a user select from pre-populated values, or inputting values into various fields. Thus, the system can receive, via the web browser, a user selection of a 3D model during the active user session.

In aspects, the editor can be launched in response to a user selecting 3D models in the virtual environment. Thus, if a user selects the elevator 3D model, the editor can be launched with the left panel 504 and the right panel 506 being displayed. The editor can also be launched through hot keys or a menu option shown to a user of the virtual environment.

In FIG. 5, the right panel 506 shows various properties that can be set. These include setting geometric properties related to how the 3D model is shown in the virtual environment. For example, values can be set for setting a position 512, setting a rotation 514, setting a scale 516, etc. Additionally, properties can be set for whether the 3D model is visible or not visible, or what happens when a trigger event 520 occurs for the 3D model. These properties are merely exemplary. A person of ordinary skill in the art reading this disclosure will recognize that other properties can be added based on the 3D model to be modified/edited/added.

In aspects, a user can set the values for each of these properties. For example, the position 512 can be set using fields indicating what location in the 3D space of the virtual environment the 3D model is to be placed. Similarly, values for the rotation 514 and scale 516 can be set. In aspects, a radio button 522 can be clicked to make the 3D model visible or not visible. In aspects, a user can also set an action to occur based on a trigger event occurring for the 3D model.

The trigger event refers to an interaction occurring with the 3D model. The trigger event can take various forms. For example, the trigger event can include a mouse click on the 3D model or a mouse hover over of the 3D model. The trigger event can also be said to occur when a user avatar is within proximity to the 3D model. For example, based on a calculated distance between the 3D model and a user avatar within the virtual environment (using for example a Euclidean distance) the trigger event can be determined to have occurred. The trigger event can also be based on other trigger events occurring for other 3D models in the virtual environment. For example, if a user enters a space of the virtual environment, other 3D models can have trigger events set to occur, such has having those 3D models become animated, play music or a sound, appearing or disappearing, etc. The trigger event can also include a detected user action. For example, a user's action can be detected based on changes detected in the video steam. For example, a user walking away from the computer can be a trigger event. Another example, of a trigger event can be a user pressing a key on a keyboard or touching a screen on a touchscreen. The trigger event can also be a movement of the user's avatar. For example, if the user's avatar jumps, moves in a certain direction, hovers, etc. The trigger event can also include a time. For example, certain events, such as sounds, chimes, etc. can occur based on a certain time of day. Trigger events can also include an event originating from outside the virtual environment (e.g., a stock index hitting a predetermined level, a real-world event, a news story, etc.). These can be based on the virtual environment being linked to external databases or data sources that can indicate such real-world events, news stories, etc.

In aspects, based on the trigger event occurring, the user can set what action happens. For example, and as shown in FIG. 5, this can be done via a field 518 in which the user can set what action occurs. For example, and as shown in FIG. 5, the trigger event is shown to be a mouse click and the action upon the mouse click is to perform an action. If, for example, the 3D model is the elevator, the action can be to open the elevator door. If for example, the 3D model is a button for the elevator door, the action can be to illuminate the button. In aspects, the illumination of the button can also trigger an event for the elevator to open after a certain time duration to simulate a real world elevator. This time duration can also be a property of the elevator that can be set using the editor. The aforementioned are merely exemplary actions and trigger events that can occur. The trigger events and actions will vary for each 3D model in the virtual environment and can constitute a plethora of actions based on the theme of the virtual environment. These can range from generating noises and sounds; causing other 3D models to appear, disappear, perform further actions, or animate; teleporting user avatars within the virtual environment; etc. A person of ordinary skill in the art will recognize how to adapt and set action based on the functionality described herein.

In aspects, once the properties of the 3D models are modified/edited by the user, these modifications/edits can be translated or compiled into JavaScript by the system without the users having to implement any code. In aspects, the JavaScript can be executed in real-time from when the values are input into the editor by the user so that they are reflected in the virtual environment in real-time from when they are made.

In aspects, the modification can also be transmitted to the servers (e.g., servers 302 of FIG. 3), which can transmit the modifications to further devices of other users of the virtual environment, so that the 3D models rendered and the modifications/edits are reflected for the other users of the virtual environment. In aspects, any actions that occur for the 3D models can also be transmitted to further devices of other users of the virtual environment. In aspects, due to the transmission delays involved when performing these transmissions, a synchronization technique must be implemented to reflect the changes made. In aspects, the synchronization can be done based on using timestamps of when the modifications/edits are made and/or when the actions occur. For example, when the modifications/edits are made, and/or when the trigger event triggering the actions occurs, a timestamp of when that modification/edit and/or trigger event occurred is taken and stored. Since the events occurring for the various 3D models are also tracked and stored by the system, in order to perform the synchronization, events that occurred in the virtual environment for the 3D models are replayed for the other users starting from the timestamp to a present time to indicate a current state of the 3D model. In which way, the state of each 3D model is preserved and tracked throughout its existence in the virtual environment, and changes made are cascaded throughout the virtual environment for all users.

In aspects, the above mentioned techniques can also be used to delete 3D models. Thus, the modifications/edits can result in 3D models being entirely deleted or some features of existing 3D models being deleted or removed.

Figure 6:
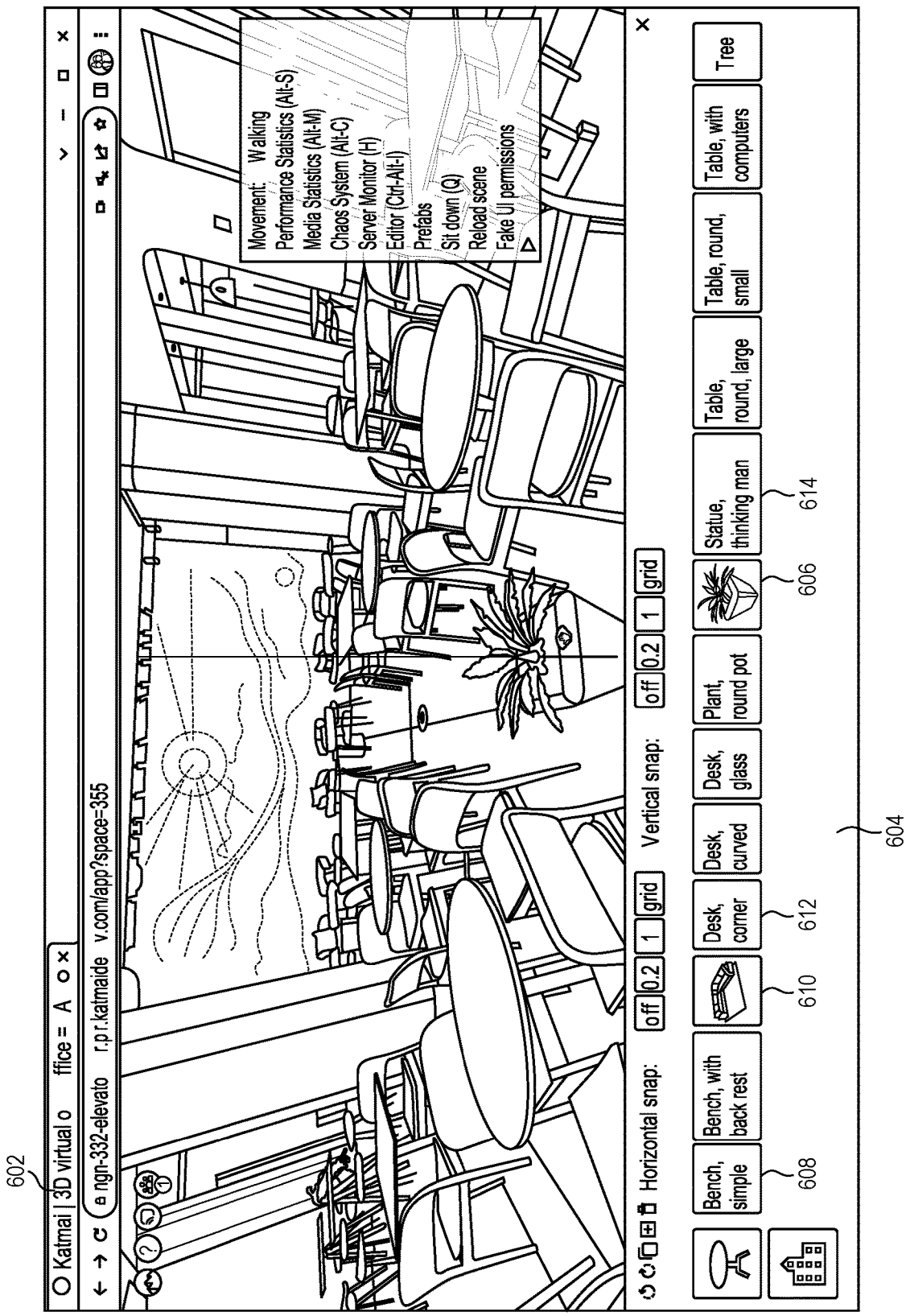
FIG. 6 is a further example interface of the editor used by users of the virtual environment to build the virtual environment, according to aspects.

FIG. 6 is a further example interface 602 of the editor used by users of the virtual environment to build the virtual environment, according to aspects. Interface 602 can be used in conjunction or in lieu of interface 502 of FIG. 5. In aspects, using interface 602, users can use drag and drop techniques to place and modify/edit 3D models into the virtual environment. For example, FIG. 6 shows a bottom panel 604 that can display various 3D models that can be added to a live screenshot of the virtual environment by a user. Similarly, 3D models can be deleted. In aspects, the 3D models can differ based on a location of the user within the virtual environment. In aspects, the 3D models can be dynamically populated into the bottom panel 604 based on the location of the user within the virtual environment. For example, a particular location in the virtual environment can have specific 3D models associated with it, and it is only those 3D models that can be displayed in the bottom panel 604.

For example, in FIG. 6, a seating area is shown, and therefore the 3D models populated in the bottom panel 604 are furniture (e.g., a bench 608, a couch 610, a desk 612, etc.), or foliage (e.g., a plant 606), or art (e.g., a statue 614). What 3D models are associated with a particular location of the virtual environment can be determined by an administrator of the system and/or of the particular location. In aspects, users can select which 3D models they would like to insert into the virtual environment by clicking on the 3D model and dragging it onto the screen and placing the 3D model. In aspects, a panel similar to the right panel 506 described with respect to FIG. 5 can also be launched in conjunction with interface 602 to allow users to further modify the 3D models by modifying/editing their properties similar to what was described with respect to FIG. 5.

While the editor described with respect to FIGS. 5 and 6 is described from the perspective of a single user doing the editing, in aspects, the editor can support multi-user or collaborative editing of the virtual environment and/or 3D models within the virtual environment. For example, in scenarios where multiple users are in the same location in the virtual environment, the multiple users can launch the editor and collaboratively modify/edit objects in real-time. In this way, multiple users can build out and/or modify the virtual environment. These changes can then be incorporated into the virtual environment and synchronized for all users of the virtual environment in real-time as described with respect to FIG. 5.

The techniques for modifying/editing 3D models and building out the virtual environment as described with respect to FIGS. 5 and 6 are unique because the techniques are performed using a system in which the virtual environment is run as an application directly from a user's browser. While other collaborative editing programs, such as Playcanvas™ have been developed to allow for collaborative modifying/editing of 3D models and structure of the virtual environment, these programs cannot be used during a live session of the virtual environment (i.e., during gameplay within the virtual environment). Thus, the techniques provided provide a unique way to modify/edit 3D models and build out the virtual environment while the virtual environment is in production.

Additionally, typical applications in which virtual environments are deployed, such as MMOs and sandbox games are run as desktop applications and not as web applications. The adoption of these techniques for a web application requires particular optimizations to take place due to the constraints of the web browser. The challenge with a real-time in-game collaborative editor for a web application (e.g. to edit 3D models while there are also active users in the game) is that to perform editing/modifying usually requires a less optimized form of the scene. Objects are usually drawn individually so they can be individually edited. For all other users, not involved in the editing/modifying, this would negatively impact performance. To resolve these performance issues, particular optimization techniques are implemented so that the editing/modifying in the current disclosure are able to be performed without negatively impacting the performance of other users. In aspects, one of these techniques when modifying an existing scene of the virtual environment is to use a de-optimized form of a scene of the virtual environment being edited for user(s) performing the editing/modifying. Any changes that are made are then transmitted to other users and applied to the optimized form of the virtual environment. In other aspects, when building out new scenes of the virtual environment, an optimized form of a scene of the virtual environment is edited and transmitted directly to all users.

In addition, further optimizations are performed. In aspects, these include merging duplicate materials, textures, 3D models, etc. to save on compute resources so as to not double process these materials, textures, 3D models, etc. when they are used when modifying/editing the virtual environment. The merging can be done by sending a single instruction to the servers to draw the duplicate materials, textures, 3D models, etc. This way, calls to the server can be reduced. Similarly, after combining multiple 3D models in a scene and processing the models to improve graphics quality, it is possible to end up with duplicate elements. The same texture (image) may be present as different copies. In aspects, these copies can be combined into a single reference.

In aspects, a further optimization is that materials used to build/modify/edit the virtual world are merged with dissimilar materials so that they render faster. Materials refers to a collection of different properties of the 3D models. These can be, for example, a color, roughness, metalness, or a number of different textures, which can add additional properties or modulate existing ones. The material influences how a certain part of an object looks. This optimization includes combine the different textures. For example, for a wooden table with metal chairs, a new texture can be generated that has the texture for the wood on the left and the texture for the metal on the right. This can also be done with a larger number of materials, for example 4, 8, etc. materials. Some of the other material properties, which are not textures can further be stored in arrays. When drawing the 3D model a shader will determine what material to use and it will select the right part of the textures and look up the right properties in the arrays.

In aspects, a further optimization is that objects that appear in a scene of the virtual environment are instantiated. Instantiation occurs when an instead of drawing the 3D model individually, it is combined with different copies of the model. For example, instead of drawing a single chair 20 times, which would be 20 draw calls, the system can combine the calls, and give the single instruction to draw the 20 chairs in one go. This reduces the number of calls to the server, resulting in increased system performance.

In aspects, a further optimization is that different 3D models can be merged. Merging 3D models can result in a new 3D model being made that combines the different shapes. For example, the system can generate a completely new 3D model that has as a shape both a table and a chair. This can be done if the material of these different objects is the same, so if, for example, both the table and the chair appear to be made of the same kind of wood.

Additionally, the techniques described in this disclosure implement a system in which the virtual environment and/or 3D models within the virtual environment can be modified/edited without having developers write, compile, and test source code before it is pushed to production. This saves compute resources, time, and money in developing the virtual environment. The use of the editor that allows properties of 3D models to be modified/edited, and/or allows 3D models to be added to the virtual environment provides several efficiencies. First, it allows end users to develop the virtual environment without the need for developers to write code, compile the code, and test the code to make changes to the virtual environment. This is because the editor is built around a framework that allows for existing 3D models and/or pre-built 3D models that are known to work in the virtual environment to be modified/edited in real-time. These changes are also pushed to the virtual environment in real-time and therefore, there is no time wasted in between when the changes are made and when they are deployed to a production environment. Thus, users are able to see the changes near instantaneously from when they are made. Moreover, any modifications/edits that are faulty, problematic, or result in poor user experience can be identified near instantaneously and changed without having the changes having to be rolled back, recoded, retested, and redeployed.

The system also provides a collaborative way to build out virtual environments. The ability to collaboratively build out virtual environments that can mimic real-world environments can transform ways in which certain industries operate. For example, the construction industry can build virtual models of buildings, sites, structures, etc. and have engineers, designers, architects, and business executives collaboratively perform the build out of these buildings, sites, structures, etc., without the need to physically be present with one another or on site. This can be done using the virtual environment using avatars that are streaming live video and audio within the virtual environment. Thus, teams can quickly mock up potential designs without the need for travel or material expense. A process that would typically take months can now be done in a matter of hours or days and at a fraction of the cost. Thus, by leveraging technology and using the disclosed system, entire industries can be transformed by transforming the way that professionals interact and collaborate.

Methods of Operating the System

Figure 7:
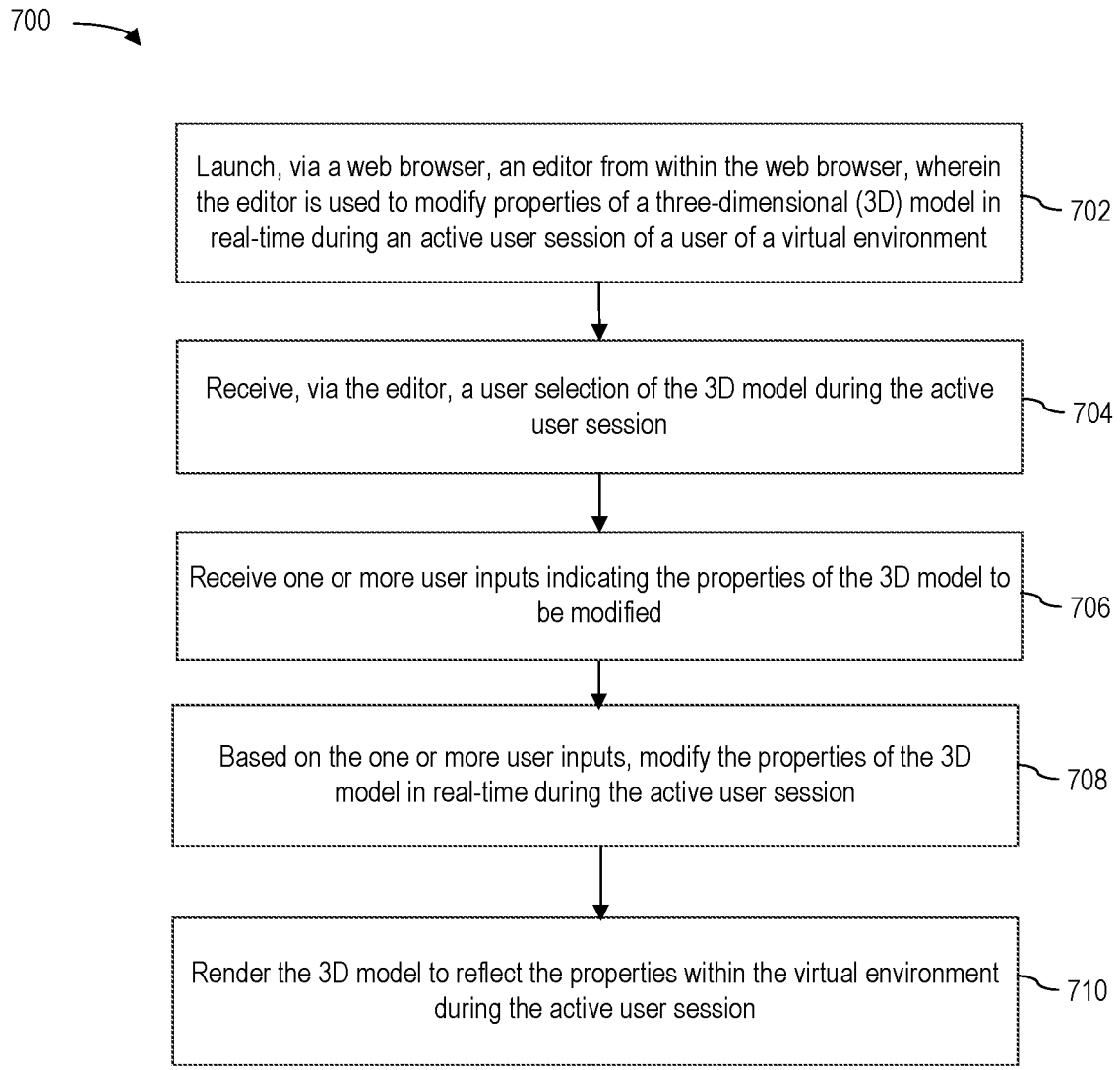
FIG. 7 is an example method of operating the system to launch the editor and use the editor to modify properties of the 3D models, according to aspects.

FIG. 7 is an example method of operating the system to launch the editor and use the editor to modify properties of the 3D models, according to aspects. Method 700 may be performed using the servers, devices, one or more computing devices, and techniques described with respect to FIGS. 1-6 and 8. In aspects, method 700 may begin, as shown in step 702, by launching, via a web browser, an editor from within the web browser, wherein the editor is used to modify properties of a three-dimensional (3D) model in real-time during an active user session of a user of a virtual environment.

As shown in step 704, in a user selection is received via the editor during the active user session. In step 706, one or more user inputs can be received indicating the properties of the 3D model to be set or modified. In step 708, based on the one or more user inputs, the properties of the 3D model can be modified in real-time. In step 710, the 3D model can be rendered to reflect the properties within the virtual environment during the active user session for other users of the virtual environment.

In aspects, modifying the properties can include setting an action to occur based on a trigger event occurring for the 3D model. In aspects, the trigger event can include, for example, a mouse click, a proximity of a user avatar to the 3D model, or a mouse hovering over the 3D model, a detected user action (e.g., a user walking away from the computer, a user pressing a key, etc), a movement of the user avatar, a time, or an event originating from outside the virtual environment (e.g., a stock index hitting a predetermined level, a real-world event, a news story, etc.). In aspects, if the trigger event occurs for the 3D model, the action can occur. In aspects, the action can be synchronized in the virtual environment for one or more other users of the virtual environment to indicate/reflect the action to the one or more other users. In aspects, the synchronization can be done by storing a timestamp indicating when the trigger event occurred, and replaying events that occurred in the virtual environment for the 3D model for the one or more other users starting from the timestamp to a present time to indicate a current state of the 3D model.

In aspects, the editor further allows modification of the virtual environment in real-time by allowing the user to add further 3D models to the virtual environment. In aspects, the further 3D models are added using drag and drop techniques. In aspects, one or more further user inputs indicating properties of the further 3D models to be modified can be received. Based on the one or more further user inputs, the properties of the further 3D models can be modified in real-time. In aspects, the further 3D models can be rendered to reflect the updated properties of the further 3D models within the virtual environment during the active user session. This way the virtual environment can be built out with various 3D models.

The operation of method 700 may be performed by the system in accordance with aspects described above.

Components of the System

Figure 8:
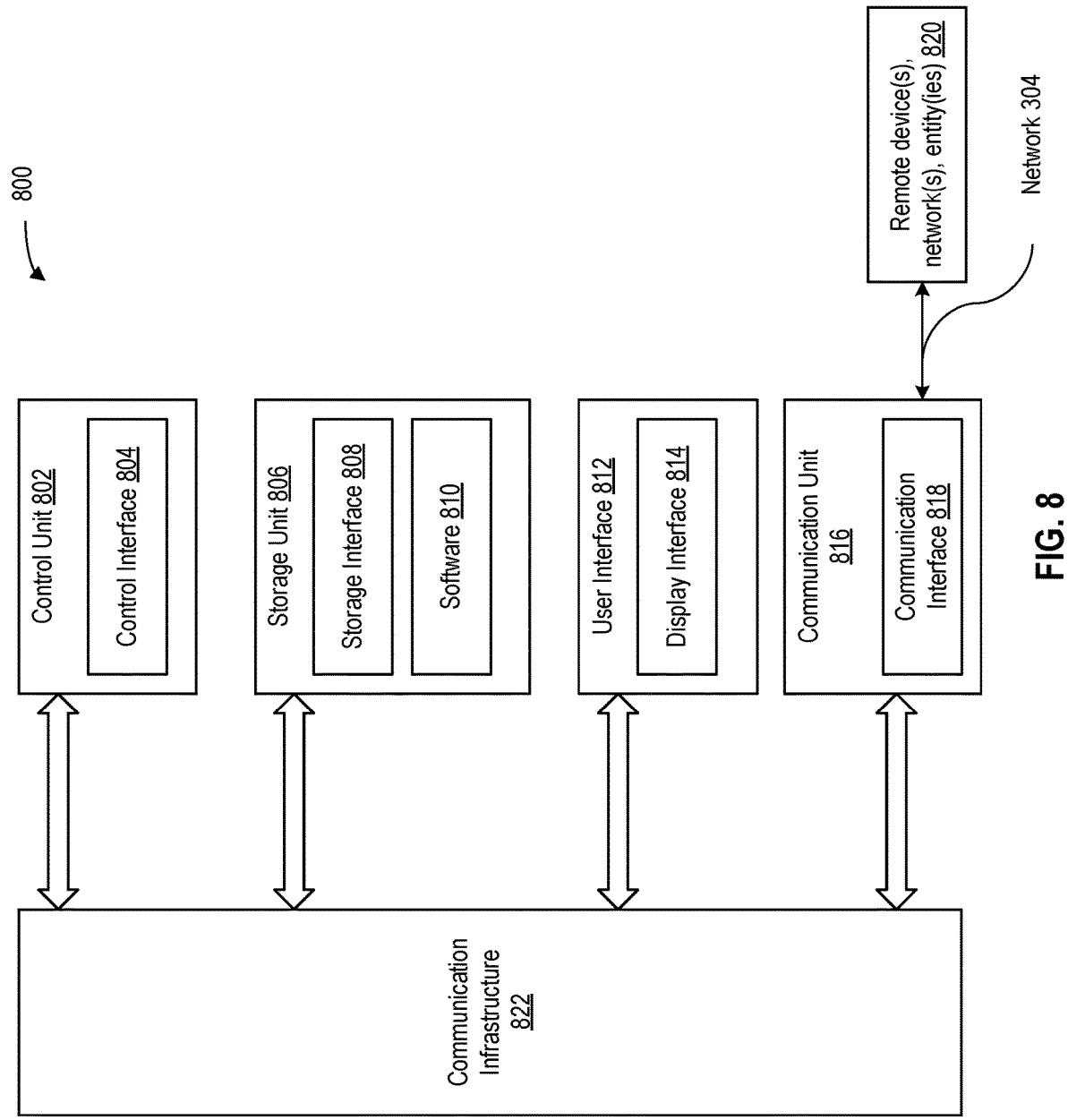
FIG. 8 is an example architecture of the components of the client devices and servers implementing the system, according to aspects.

FIG. 8 is an example architecture 800 of the components of the client devices (e.g., 306a and 306b) and servers (e.g., servers 302) implementing the system, according to aspects. In aspects, the components may include a control unit 802, a storage unit 806, a communication unit 816, and a user interface 812. The control unit 802 may include a control interface 804. The control unit 802 may execute a software 810 to provide some or all of the intelligence of the system. The control unit 802 may be implemented in a number of different ways. For example, the control unit 802 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 804 may be used for communication between the control unit 802 and other functional units or devices of the system. The control interface 804 may also be used for communication that is external to the functional units or devices of the system. The control interface 804 may receive information from the functional units or devices of the system, or from remote devices 820, or may transmit information to the functional units or devices of the system, or to remote devices 820. The remote devices 820 refer to units or devices external to the system.

The control interface 804 may be implemented in different ways and may include different implementations depending on which functional units or devices of the system or remote devices 820 are being interfaced with the control unit 802. For example, the control interface 804 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 804 may be connected to a communication infrastructure 822, such as a bus, to interface with the functional units or devices of the system or remote devices 820.

The storage unit 806 may store the software 810. For illustrative purposes, the storage unit 806 is shown as a single element, although it is understood that the storage unit 806 may be a distribution of storage elements. Also for illustrative purposes, the storage unit 806 is shown as a single hierarchy storage system, although it is understood that the storage unit 806 may be in a different configuration. For example, the storage unit 806 may be formed with different storage technologies forming a memory hierarchical system including different levels of caching, main memory, rotating media, or off-line storage. The storage unit 806 may be a volatile memory, a nonvolatile memory, an internal memory, an external memory, or a combination thereof. For example, the storage unit 806 may be a nonvolatile storage such as nonvolatile random access memory (NVRAM), Flash memory, or disk storage, or a volatile storage such as static random access memory (SRAM) or dynamic random access memory (DRAM).

The storage unit 806 may include a storage interface 808. The storage interface 808 may be used for communication between the storage unit 806 and other functional units or devices of the system. The storage interface 808 may also be used for communication that is external to the system. The storage interface 808 may receive information from the other functional units or devices of the system or from remote devices 820, or may transmit information to the other functional units or devices of the system or to remote devices 820. The storage interface 808 may include different implementations depending on which functional units or devices of the system or remote devices 820 are being interfaced with the storage unit 806. The storage interface 808 may be implemented with technologies and techniques similar to the implementation of the control interface 804.

The communication unit 816 may enable communication to devices, components, modules, or units of the system or to remote devices 820. For example, the communication unit 816 may permit the system to communicate between its components the client devices (e.g., devices 306a and 306b), and the servers 302. The communication unit 816 may further permit the devices of the system to communicate with remote devices 820 such as an attachment, a peripheral device, or a combination thereof through the network 304.

As previously indicated with respect to FIG. 3, the network 304 may span and represent a variety of networks and network topologies. For example, the network 304 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 304. Cable, Ethernet, digital subscriber line (DSL), fiber optic lines, fiber to the home (FTTH), and plain old telephone service (POTS) are examples of wired communication that may be included in the network 304. Further, the network 304 may traverse a number of network topologies and distances. For example, the network 304 may include direct connection, personal area network (PAN), local area network (LAN), metropolitan area network (MAN), wide area network (WAN), or a combination thereof.

The communication unit 816 may also function as a communication hub allowing the system to function as part of the network 304 and not be limited to be an end-point or terminal unit to the network 304. The communication unit 816 may include active and passive components, such as microelectronics or an antenna, for interaction with the network 304.

The communication unit 816 may include a communication interface 818. The communication interface 818 may be used for communication between the communication unit 816 and other functional units or devices of the system or to remote devices 820. The communication interface 818 may receive information from the other functional units or devices of the system, or from remote devices 820, or may transmit information to the other functional units or devices of the system or to remote devices 820. The communication interface 818 may include different implementations depending on which functional units or devices are being interfaced with the communication unit 816. The communication interface 818 may be implemented with technologies and techniques similar to the implementation of the control interface 804.

The user interface 812 may present information generated by the system. In aspects, the user interface 812 allows a user to interface with the devices of the system or remote devices 820. The user interface 812 may include an input device and an output device. Examples of the input device of the user interface 812 may include a keypad, buttons, switches, touchpads, soft-keys, a keyboard, a mouse, or any combination thereof to provide data and communication inputs. Examples of the output device may include a display interface 814. The control unit 802 may operate the user interface 812 to present information generated by the system. The control unit 802 may also execute the software 810 to present information generated by the system, or to control other functional units of the system. The display interface 814 may be any graphical user interface such as a display, a projector, a video screen, or any combination thereof.

The terms "module" or "unit" referred to in this disclosure can include software, hardware, or a combination thereof in an aspect of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, passive devices, or a combination thereof. Further, if a module or unit is written in the system or apparatus claims, the module or unit is deemed to include hardware circuitry for the purposes and the scope of the system or apparatus claims.

The modules and units in the aforementioned description of the aspects may be coupled to one another as described or as shown. The coupling may be direct or indirect, without or with intervening items between coupled modules or units. The coupling may be by physical contact or by communication between modules or units.

The above detailed description and aspects of the disclosed system are not intended to be exhaustive or to limit the disclosed system to the precise form disclosed above. While specific examples for the system are described above for illustrative purposes, various equivalent modifications are possible within the scope of the disclosed system, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting system and method 700 is cost-effective, highly versatile, and accurate, and may be implemented by adapting components for ready, efficient, and economical manufacturing, application, and utilization. Another important aspect of aspects of the present disclosure is that it valuably supports and services the historical trend of reducing costs, simplifying systems, and/or increasing performance.

These and other valuable aspects of the present disclosure consequently further the state of the technology to at least the next level. While the disclosed aspects have been described as the best mode of implementing the system, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computer-implemented method comprising:
launching, by one or more computing devices and via a web browser, an editor from within the web browser, wherein the editor renders a de-optimized version of a scene of a virtual environment and is used to modify properties of a three-dimensional (3D) model in the scene in real-time during an active user session of a user of the virtual environment;
receiving, by the one or more computing devices and via the editor, a user selection of the 3D model during the active user session;
receiving, by the one or more computing devices, one or more user inputs indicating the properties of the 3D model to be modified;
based on the one or more user inputs, compiling, by the one or more computing devices, the properties of the 3D model in real-time during the active user session to modify the properties of the 3D model during the active user session;
rendering, by the one or more computing devices, the 3D model to reflect the properties within the virtual environment during the active user session;
rendering, by the one or more computing devices, an optimized version of the scene to reflect the modified properties of the 3D model, wherein the optimized version of the scene is obtained via merging duplicate materials, textures, or 3D models to render the scene to other users of the virtual environment and to reduce calls to the one or more computing devices when rendering the scene; and
transmitting, by the one or more computing devices, the optimized version of the scene to the other users of the virtual environment during the active user session.

2. The method of claim 1, wherein modifying the properties comprises setting an action to occur based on a trigger event occurring for the 3D model.

3. The method of claim 2, wherein the trigger event comprises:
a mouse click,
a proximity of a user avatar to the 3D model,
a mouse hovering over the 3D model,
a detected user action,
a movement of the user avatar,
a time, or
an event originating from outside the virtual environment.

4. The method of claim 2, further comprising:
performing, by the 3D model, the action when the trigger event occurs; and
synchronizing, by the one or more computing devices, the virtual environment for one or more other users of the virtual environment to indicate the action to the one or more other users, wherein the synchronization comprises:
storing a timestamp indicating when the trigger event occurred, and
replaying events that occurred in the virtual environment for the 3D model for the one or more other users starting from the timestamp to a present time to indicate a current state of the 3D model.

5. The method of claim 1, wherein the editor further allows modification of the virtual environment in real-time by allowing the user to add further 3D models to the virtual environment.

6. The method of claim 5, wherein the further 3D models are added using drag and drop techniques.

7. The method of claim 5, further comprising:
receiving, by the one or more computing device, one or more further user inputs indicating properties of the further 3D models to be modified;
based on the one or more further user inputs, modifying, by the one or more computing devices, the properties of the further 3D models in real-time; and
rendering, by the one or more computing devices, the further 3D models to reflect the properties of the further 3D models within the virtual environment during the active user session.

8. A non-transitory computer readable medium including instructions, that when executed by a computing system cause the computing system to perform operations comprising:
launching, via a web browser, an editor from within the web browser, wherein the editor renders a de-optimized version of a scene of a virtual environment and is used to modify properties of a three-dimensional (3D) model in the scene in real-time during an active user session of a user of the virtual environment;
receiving, via the editor, a user selection of the 3D model during the active user session;
receiving one or more user inputs indicating the properties of the 3D model to be modified;
based on the one or more user inputs, compiling the properties of the 3D model in real-time during the active user session to modify the properties of the 3D model during the active user session;
rendering the 3D model to reflect the properties within the virtual environment during the active user session;
rendering an optimized version of the scene to reflect the modified properties of the 3D model, wherein the optimized version of the scene is obtained via merging duplicate materials, textures, or 3D models to render the scene to other users of the virtual environment and to reduce calls to the one or more computing devices when rendering the scene; and
transmitting the optimized version of the scene to the other users of the virtual environment during the active user session.

9. The non-transitory computer readable medium of claim 8, wherein modifying the properties comprises setting an action to occur based on a trigger event occurring for the 3D model.

10. The non-transitory computer readable medium of claim 9, wherein the trigger event comprises:
a mouse click,
a proximity of a user avatar to the 3D model,
a mouse hovering over the 3D model,
a detected user action,
a movement of the user avatar,
a time, or
an event originating from outside the virtual environment.

11. The non-transitory computer readable medium of claim 9, wherein the operations further comprise:
performing, by the 3D model, the action when the trigger event occurs; and
synchronizing the virtual environment for one or more other users of the virtual environment to indicate the action to the one or more other users, wherein the synchronization comprises:
storing a timestamp indicating when the trigger event occurred, and
replaying events that occurred in the virtual environment for the 3D model for the one or more other users starting from the timestamp to a present time to indicate a current state of the 3D model.

12. The non-transitory computer readable medium of claim 8, wherein the editor further allows modification of the virtual environment in real-time by allowing the user to add further 3D models to the virtual environment.

13. The non-transitory computer readable medium of claim 12, wherein the further 3D models are added using drag and drop techniques.

14. The non-transitory computer readable medium of claim 12, wherein the operations further comprise:
receiving one or more further user inputs indicating properties of the further 3D models to be modified;
based on the one or more further user inputs, modifying the properties of the further 3D models in real-time; and
rendering the further 3D models to reflect the properties of the further 3D models within the virtual environment during the active user session.

15. A computing system comprising:
a memory configured to store instructions;
one or more processors, coupled to the memory, configured to process the stored instructions to perform operations comprising:
launching, via a web browser, an editor from within the web browser, wherein the editor renders a de-optimized version of a scene of a virtual environment and is used to modify properties of a three-dimensional (3D) model in the scene in real-time during an active user session of a user of the virtual environment;
receiving, via the editor, a user selection of the 3D model during the active user session;
receiving one or more user inputs indicating the properties of the 3D model to be modified;
based on the one or more user inputs, compiling devices the properties of the 3D model in real-time during the active user session to modify the properties of the 3D model during the active user session;
rendering the 3D model to reflect the properties within the virtual environment during the active user session;
rendering an optimized version of the scene to reflect the modified properties of the 3D model, wherein the optimized version of the scene is obtained via merging duplicate materials, textures, or 3D models to render the scene to other users of the virtual environment and to reduce calls to the one or more computing devices when rendering the scene; and
transmitting the optimized version of the scene to the other users of the virtual environment during the active user session.

16. The computing system of claim 15, wherein modifying the properties comprises setting an action to occur based on a trigger event occurring for the 3D model.

17. The computing system of claim 16, wherein the trigger event comprises:
a mouse click,
a proximity of a user avatar to the 3D model,
a mouse hovering over the 3D model,
a detected user action,
a movement of the user avatar,
a time, or
an event originating from outside the virtual environment.

18. The computing system of claim 16, wherein the operations further comprise:
performing, by the 3D model, the action when the trigger event occurs; and
synchronizing the virtual environment for one or more other users of the virtual environment to indicate the action to the one or more other users, wherein the synchronization comprises:
storing a timestamp indicating when the trigger event occurred, and
replaying events that occurred in the virtual environment for the 3D model for the one or more other users starting from the timestamp to a present time to indicate a current state of the 3D model.

19. The computing system of claim 15, wherein the editor further allows modification of the virtual environment in real-time by allowing the user to add further 3D models to the virtual environment.

20. The computing system of claim 19, wherein:
the further 3D models are added using drag and drop techniques; and
the operations further comprise:
receiving one or more further user inputs indicating properties of the further 3D models to be modified;
based on the one or more further user inputs, modifying the properties of the further 3D models in real-time; and
rendering the further 3D models to reflect the properties of the further 3D models within the virtual environment during the active user session.

* * * * *

UNITED STATES PATENT AND TRADEMARK OFFICE
CERTIFICATE OF CORRECTION

PATENT NO. : 12,125,163 B1
APPLICATION NO. : 18/491047
DATED : October 22, 2024
INVENTOR(S) : Polyakov et al.

It is certified that error appears in the above-identified patent and that said Letters Patent is hereby corrected as shown below:

In the Claims

In Column 24, Claim 15, Line 2, after "compiling" delete "devices".

Signed and Sealed this
Fourth Day of February, 2025

Coke Morgan Stewart
*Acting Director of the United States Patent and Trademark Office*